(12) United States Patent
Nishihata et al.

(10) Patent No.: US 7,198,734 B2
(45) Date of Patent: Apr. 3, 2007

(54) IC SOCKET

(75) Inventors: Naomitsu Nishihata, Fukushima (JP); Masahito Tada, Fukushima (JP)

(73) Assignee: Kureha Corporation, Tokyo (JP)

(*) Notice: Subject to any disclaimer, the term of this patent is extended or adjusted under 35 U.S.C. 154(b) by 42 days.

(21) Appl. No.: 10/471,118

(22) PCT Filed: Mar. 27, 2002

(86) PCT No.: PCT/JP02/02945

§ 371 (c)(1),
(2), (4) Date: Sep. 8, 2003

(87) PCT Pub. No.: WO02/082592

PCT Pub. Date: Oct. 17, 2002

(65) Prior Publication Data

US 2004/0082205 A1   Apr. 29, 2004

(30) Foreign Application Priority Data

Apr. 3, 2001 (JP) .............................. 2001-105212

(51) Int. Cl.
*H01B 1/24* (2006.01)
*H01R 12/14* (2006.01)
*H05K 7/14* (2006.01)

(52) U.S. Cl. .................... 252/511; 439/55; 439/86; 361/760

(58) Field of Classification Search ................ 252/502, 252/510, 511; 439/55, 86, 87; 257/499, 257/537; 361/760
See application file for complete search history.

(56) References Cited

U.S. PATENT DOCUMENTS

| 4,918,513 | A | * | 4/1990 | Kurose et al. ................ 439/73 |
| 5,226,824 | A | * | 7/1993 | Karlovich et al. ............ 439/70 |
| 5,745,346 | A | * | 4/1998 | Ogawa et al. ............... 361/769 |
| 6,545,081 | B1 | * | 4/2003 | Nishihata et al. ........... 524/495 |

FOREIGN PATENT DOCUMENTS

| JP | 05-129480 | | 5/1993 |
| JP | 07-179758 | | 7/1995 |
| JP | 08-176441 | | 7/1996 |
| JP | 08-176442 | | 7/1996 |
| JP | 09-087418 | | 3/1997 |
| JP | 11-323131 | | 11/1999 |
| JP | 2000150094 | | 5/2000 |
| JP | 2000212453 | | 8/2000 |
| WO | WO 00/34369 | * | 6/2000 |

* cited by examiner

*Primary Examiner*—Mark Kopec
(74) *Attorney, Agent, or Firm*—Dinsmore & Shohl LLP

(57) ABSTRACT

The invention provides an IC socket of synthetic resin, whose surface resistivity is strictly controlled to the desired level and which is much more improved in terms of electrical insulation properties, mechanical properties, heat resistance, chemical resistance, dimensional stability, etc. The IC socket is obtained by molding or otherwise forming a thermoplastic resin composition comprising 40 to 94% by mass of a thermoplastic resin, 5 to 30% by mass of a carbon precursor having a volume resistivity of $10^2$ to $10^{10}$ $\Omega \cdot cm$ and 1 to 30% by mass of an electrical conductive filler having a volume resistivity of less than $10^2$ $\Omega \cdot cm$.

9 Claims, 2 Drawing Sheets

IC SOCKET

TECHNICAL FIELD

The present invention relates generally to an IC socket for packaging or measuring purposes used in the electric and electronic fields, and more particularly to an IC socket whose surface resistivity is strictly controlled to the desired level and which is improved in terms of electrical insulation properties, mechanical properties, heat resistance, chemical resistance, dimensional stability, etc.

By the term "IC socket" used herein is intended a packaging socket used as a sort of connector to package semiconductor devices on wiring boards in the electronics packaging applications, a measuring socket that is a jig for electrical measurements used in the initial screening of semiconductor devices, etc. The IC socket of the invention is formed of thermoplastic resin materials, and may be additionally provided with conventional attachments such as pins for conduction.

BACKGROUND ART

Packaging IC sockets are often used within general electronic equipment. For instance, a socket is used as a sort of connector for the purpose of mounting LSI packages on wiring boards. LSIs mounted on wiring boards using a socket are inspected in the form of wiring modules. If there is something wrong in an LSI, that LSI may then be replaced by another LSI. LSIs in existing modules may be removed out of sockets for replacement with the latest ones.

Packaging IC sockets are required to have the shape and function commensurate with LSI packages, and must also have the specifications corresponding to the pitch and shape of LSI package terminals. There are pin grid arrays (PGAs) whose terminals are of rod shape and ball grid arrays (BGAs) whose terminals are of spherical shape. To engage sockets with these terminals, the shapes of sockets' contacts and how to fit the sockets must be well fit for the respective terminals.

Recent trends in LSI packaging are toward bare chip packaging or flip chip packaging with no LSI package. Associated sockets, too, must be revamped to keep up with such trends. Packaging IC sockets, like other packaging parts such as wiring boards, are now required to have smaller size, higher reliability, higher density (narrower pitch), higher transmission speed, lower noises, etc.

In semiconductor fabrication processes, on the other hand, measuring IC sockets are employed for inspections by burn-in testing. The burn-in testing is one of the screening methods for eliminating initial defects in semiconductor devices, wherein accelerated stress is applied to the devices at temperatures and voltages higher than in their operating conditions to accelerate the occurrence of defects, thereby screening out defective devices within short time spans.

In one typical burn-in testing method, bare chips or packaged devices are located within IC sockets in a high-temperature tank, and power source voltages or input signals providing accelerated stresses are externally applied thereto for a constant time. Removed out of the sockets, whether the devices are accepted or rejected is then determined.

FIG. 1 is a sectional schematic illustrate of one example of the measuring IC socket. A bare chip 1 comprising a bare chip body 11 and bumps 12 is placed on the table of an IC socket 2. The IC socket 2 is made up of a socket body 21, contact probe pins 22, a lid 23, etc. For the pins 22 to come into contact with terminals such as bumps for conduction, for instance, deflection pins or insert pins may be used. Burn-in testing is carried out while the lid 23 is closed. After the completion of the burn-in testing, bare chips judged as acceptable are mounted on board substrates in a multi-chip packaging fashion.

FIG. 2 is a top schematic illustrative of one example of a burn-in socket for fine ball grid array (FBGA) packaging, and FIG. 3 is a sectional schematic of the socket. A socket 3 is built up of contact pins 31 arranged at a constant pitch, a lid 32, springs 33, a body (bottom) 34, etc.

In FIG. 3, pins 31' extending conductively to a testing machine are also depicted. An FBGA package 35 is placed on a table while it is in contact with the pins 31. The pins 31 are designed in terms of shape, pitch, number, etc. so that they can come into contact with a number of spherical terminals.

IC sockets are now required to have good electrical insulation properties, withstand voltage, mechanical properties, heat resistance, chemical resistance, dimension stability, etc. Some IC sockets are formed of ceramic materials or metals having insulated surfaces. In most cases, however, they are formed of synthetic resins.

In view of the aforesaid electrical insulation properties, hat resistance, etc., IC sockets of synthetic resins, for instance, are formed of thermoplastic resin of high heat resistance such as polyether imide, poly(phenylene sulfide), polysulfone, poly(ether sulfone) and polybutylene terephthalate (JP-A's 07-179758, 08-176441, 08-176442 and 2000-150094).

IC sockets of synthetic resins, because of being required to have a high degree of insulation resistance, have generally high surface resistivity. IC sockets having too high surface resistivity are likely to be deposited on their surface with static electricity. As semiconductor devices are in touch with IC sockets in the inspection process of the semiconductor devices, IC sockets are susceptible to electrification via triboelectrification.

As the packaging density of semiconductor devices becomes high, on the other hand, the number of input/output pins of chips increases with narrowing pitch. When multi-pin PGAs or BGAs, bare chips or the like are mounted on IC sockets, their contact with the surfaces of IC sockets makes damage to these semiconductor devices likely. Adsorbed to the surfaces of IC sockets by static electricity, airborne dust contaminates semiconductor devices.

The surface resistivity of IC sockets may be lowered by forming IC sockets using synthetic resins with antistats added thereto. However, the antistatic agent present on the surface of an IC socket is readily removed by washing or friction, and so it is difficult to achieve the given antistatic effect over an extended period of time. When a large amount of the antistatic agent is added to sustain the antistatic effect, the antistatic agent bleeds on the surface of the IC socket, resulting in the deposition of dust thereon. In addition, the bleeding antistatic agent leads to possible pollution of surrounding environments through elution and vaporization.

The surface resistivity reduction may be achieved by forming IC sockets using synthetic resins with conductive fillers filled therein. However, resin compositions comprising synthetic resins and conductive fillers having extremely low electrical resistivity such as conductive carbon blacks, graphite, carbon fibers, metal fibers, and metal powders suffer from drastic electrical resistivity changes depending on the proportion of the conductive filler incorporated and delicate fluctuations of the state of dispersion of the filler.

Possible reasons for this could be that there is an extraordinary difference in electrical resistivity between conductive fillers and synthetic resins, and that when individual conductive filler particles are dispersed in a synthetic resin while they are joined to one another, conductivity appears drastically because the occurrence of conductivity is dependent on the state of dispersion of a conductive filler.

In addition, the state of dispersion of the conductive filler in the synthetic resin varies from site to site, and so the resulting product tends to take a form wherein a portion having very high surface resistivity and a portion having very low surface resistivity coexist. With such a process using conductive fillers, it is thus still difficult to achieve stable production of IC sockets having their surface resistivity brought down to the desired level while keeping electrical insulating properties.

DISCLOSURE OF THE INVENTION

An object of the invention is to provide a synthetic resin IC socket whose surface resistivity is strictly controlled to the desired level and which is much more improved in terms of electrical insulation properties, mechanical properties, heat resistance, chemical resistance, dimensional stability, etc.

As a result of intensive studies made so as to accomplish the aforesaid object, the inventors have figured out an IC socket comprising a thermoplastic resin to which a combination of a carbon precursor having specific volume resistivity and a conductive filler having specific volume resistivity is added.

The combined use of a specific carbon precursor and a specific conductive filler enables IC sockets with properly reduced surface resistivity to be produced in a stable manner. It is thus possible to fabricate IC sockets having site-depending surface resistivity variations much more reduced than could be achieved with the sole use of the conductive filler.

By regulating the proportion of the carbon precursor and conductive filler incorporated together, it is also possible to obtain an IC socket having surface resistivity reduced down to the desired level while keeping electrical insulation properties.

More specifically, it has now been found according to the invention that the surface resistivity of an IC socket can be strictly controlled to the desired level in the range of $10^5$ to $10^{13}$ $\Omega/\square$. By controlling the surface resistivity of the IC socket within this range, it is possible to overcome damage or contamination problems with semiconductor devices, which are caused by static electricity.

In consideration of heat resistance, an IC socket should preferably have a deflection temperature under load of 170° C. or higher. To this end, it is preferable to use crystalline or amorphous thermoplastic resins excellent in heat resistance. The present invention has underlain these findings.

According to the present invention, there is provided an IC socket that is obtained by forming or molding a thermoplastic resin composition comprising (A) 40 to 94% by mass of a thermoplastic resin, (B) 5 to 30% by mass of a carbon precursor having a volume resistivity of $10^2$ to $10^{10}$ $\Omega \cdot cm$ and (C) 1 to 30% by mass of an electrically conductive filler having a volume resistivity of less than $10^2$ $\Omega \cdot cm$.

BEST MODE FOR CARRYING OUT THE INVENTION

1. Thermoplastic Resins

Figure 1:
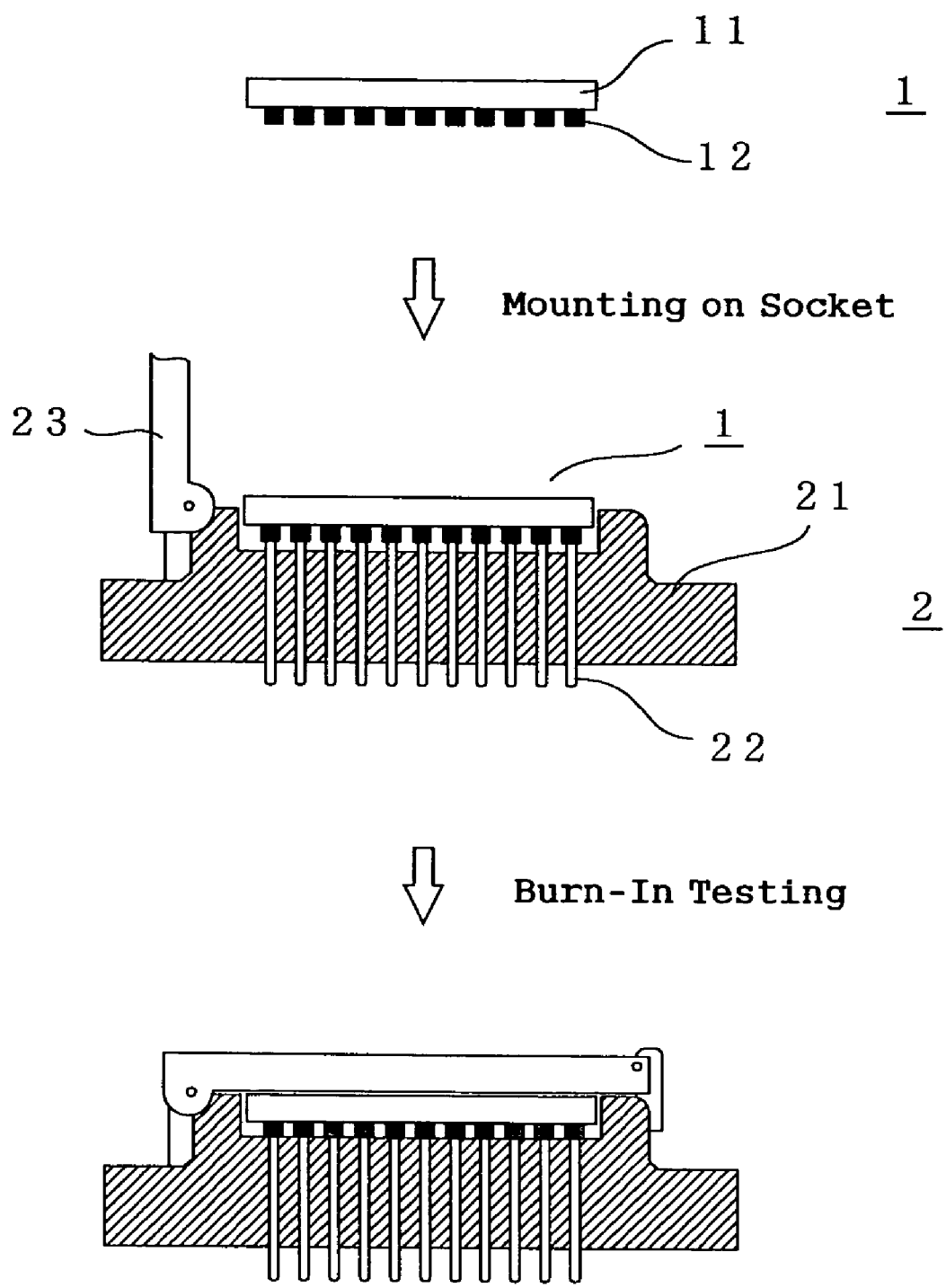
FIG. 1 is a sectional schematic illustrative of how one example of a burn-in testing IC socket is used.

By way of example but not exclusively, the thermoplastic resin used herein include polybutylene terephthalate, polyethylene terephthalate, polyamide, poly(phenylene ether), modified poly(phenylene ether), poly(phenylene sulfide), poly(ether ether ketone), poly(ether ketone), poly(phenylene sulfide ketone), poly(phenylene sulfide sulfone), poly(ether nitrile), total aromatic polyester, liquid crystal polyester, polyarylate, polysulfone, poly(ether sulfone), polyether imide, polyamide-imide, polyimide, polyaminobismaleimide, polymethylpentene, and fluorocarbon resin.

These thermoplastic resins may be used alone or in admixture of two or more. Exemplary admixtures are a polybutylene terephthalate/polyethylene trephthalate blend, poly(phenylene ether)/polyamide blend, and a poly (phenylene ether)/polybutylene terephthalate blend.

Of these thermoplastic resins, preference is given to at least one heat-resistant resin selected from the group consisting of a crystalline resin (A1) having a melting point of 220° C. or higher and an amorphous resin (A2) having a glass transition temperature of 170° C. or higher.

Preferable, but not exclusive, examples of the crystalline resin having a melting point of 220° C. or higher are polybutylene terephthalate (224 to 228° C.), polyethylene terephthalate (248 to 260° C.), nylon 6 (220 to 228° C.), nylon 66 (260 to 265° C.), nylon 46 (290° C.), poly (phenylene sulfide)(280 to 295° C.), poly(ether ether ketone) (334° C.), total aromatic polyester (450° C. or higher), polymethylpentene (235° C.), polytetrafluoroethylene (327° C.), tetrafluoroethylene/hexafluoropropylene/perfluoroalkoxy-vinyl ether copolymer (290 to 300° C.), tetrafluoroethylene/ethylene copolymer (260 to 270° C.), polyvinyl fluoride (227° C.), tetrafluoroethylene/hexafluoropropylene copolymer (253 to 282° C.), and tetrafluoroethylene/perfluoroalkyl-vinyl ether copolymer (302 to 310° C.), the bracketed figures being representative melting points.

Preferable, but not exclusive, examples of the amorphous resin having a glass transition temperature of 170° C. or higher are poly(phenylene ether)(220° C.), polyarylate (193° C.), polysulfone (190° C.), poly(ether sulfone)(225 to 230° C.), poly(ether imide)(217° C.), and polyamide-imide (280 to 285° C.), the bracketed figures being representative glass transition temperatures.

Thermoplastic polyimide (Tg=250° C.) that is a crylstalline resin, too, may be used as the amorphous resin. This resin is of crystalline nature under ordinary forming conditions, and crystallized by post-forming thermal treatment. Besides, crystalline resin/amorphous resin blends may be used.

Of these thermoplastic resins, particular preference is given to amorphous resins such as poly(ether sulfone), polysulfone and poly(ether imide) as well as crystalline resins such as poly(phenylene sulfide) and poly(ether ether ketone).

The proportion of the thermoplastic resin or resins incorporated should be in the range of 40 to 94% by mass on the basis of the total amount of the thermoplastic resin composition. Too much thermoplastic resin causes the surface resistivity of an IC socket to become high, and so makes it difficult to obtain an IC socket having the desired surface resistivity. Too little thermoplastic resin renders the surface resistivity and electrical insulation properties of an IC socket too low. Thus, the proportion of the thermoplastic resin or resins should be in the range of preferably 50 to 90% by mass, and more preferably 60 to 85% by mass.

2. Carbon Precursor

The carbon precursor used herein and having a volume resistivity in the range of $10^2$ to $10^{10}$ $\Omega \cdot cm$, for instance, may be obtained by firing an organic substance at temperatures of 400 to 900° C. in an inert atmosphere.

More specifically, the carbon precursor may be obtained by (1) a process wherein tar or pitch such as petroleum tar, petroleum pitch, coal tar or coal pitch is heated for aromatization and polycondensation, if required oxidized and made infusible in an oxidizing atmosphere, and then heated and fired in an inert atmosphere, (2) a process wherein a thermoplastic resin such as polyacrylonitrile or polyvinyl chloride is made infusible in an oxidizing atmosphere, and then heated and fired in an inert atmosphere, and (3) a process wherein a thermosetting resin such as phenol resin or furan resin is set by heating, and then heated and fired in an inert atmosphere.

The term "carbon precursor" used herein is understood to mean a substance that is obtained by such processes while it is not completely carbonized or has a carbon content of 97% by mass or below. As the organic substance is fired in an inert atmosphere, the carbon content of the obtained fired product tends to rise with increasing firing temperature. The carbon content of a carbon precursor may be easily controlled by proper determination of firing temperature.

The carbon precursor used herein and having a volume resistivity of $10^2$ to $10^{10}$ $\Omega \cdot cm$ should preferably have a carbon content of 80 to 97% by mass. When the carbon content of the carbon precursor is too small, the volume resistivity becomes too high to reduce the surface resistivity of the obtained IC socket down to $10^{13}$ $\Omega/\square$ or less. When the carbon content of the carbon precursor is too large, the volume resistivity becomes low; the surface resistivity of the obtained IC socket becomes too low. To add to this, the surface resistivity of the IC socket changes drastically in response to a slight change in the amount of the carbon precursor incorporated. Thus, the use of a carbon precursor having a volume resistivity deviating from the aforesaid range makes it difficult to produce an IC socket having the desired surface resistivity in a stable fashion with improved reproducibility. The volume resistivity of the carbon precursor should be in the range of preferably $10^2$ to $10^{10}$ $\Omega \cdot cm$, and more preferably $10^4$ to $10^9$ $\Omega \cdot cm$.

The carbon precursor is usually used in a particulate or fibrous form. The carbon precursor used herein, when employed in a particulate form, should preferably have a mean particle diameter of 1 mm or less. When the mean particle diameter of the carbon precursor is too large, it is hard to mold or otherwise form any IC socket having a good appearance. The mean particle diameter of the carbon precursor should be in the range of preferably 0.1 μm to 1 mm, more preferably 0.5 to 500 μm, and even more preferably 1 to 100 μm. In most cases, satisfactory results are obtainable by use of a carbon precursor having a mean particle diameter of about 5 to 50 μm.

The carbon precursor used herein, when employed in a fibrous form, should preferably have a mean diameter of 0.1 mm or less. Carbon precursor fibers exceeding 0.1 mm have difficulty in molding or otherwise forming any IC socket having a good appearance. A long fiber form of carbon precursor may be used because it is cut into short fibers by kneading with the thermoplastic resin. In view of dispersibility, however, it is preferable to use a short fiber form of carbon precursor.

The proportion of the carbon precursor incorporated is in the range of 5 to 30% by mass on the basis of the total amount of the thermoplastic resin composition. At too high a proportion of the carbon precursor, the surface resistivity of the IC socket becomes too low or it is difficult to control that surface resistivity to the desired level or, preferably, in the range of $10^5$ to $10^{13}$ $\Omega/\square$. At too low a proportion of the carbon precursor, on the other hand, it is difficult to bring the surface resistivity of the IC socket down to a sufficient level.

The proportion of the carbon precursor incorporated should be in the range of preferably 6 to 28% by mass, and more preferably 10 to 25% by mass. The combined use of the carbon precursor with the conductive filler enables the surface resistivity of the IC socket to be lowered to the desired level, and achieves effective prevention of site-depending surface resistivity variations.

3. Conductive Filler

By way of example but not by way of limitation, the conductive filler used herein and having a volume resistivity of less than $10^2$ $\Omega \cdot cm$ includes carbon fibers, graphite, conductive carbon blacks, and metal powders among which, in consideration of controllability, reproducibility, etc. of surface resistivity, conductive carbon materials such as carbon fibers, graphite, conductive carbon blacks and their mixtures are preferred. Such conductive carbon materials may be used in a particulate (powdery or flaky) form or in a fibrous form.

No particular limitation is imposed on the carbon fibers used herein; various carbon fibers such as cellulose based carbon fibers, polyacrylonitrile (PAN) based carbon fibers, lignin based carbon fibers and pitch (coal pitch, petroleum pitch) based carbon fibers may be used. The carbon fibers used should preferably have a mean diameter of 0.1 mm or less. The use of carbon fibers having a mean diameter exceeding 0.1 mm makes it difficult to mold or otherwise form an IC socket having a good appearance. The carbon fibers used should preferably take the form of short fibers having a mean length of 50 μm or greater. The use of carbon fibers having a mean length of 50 μm or less results in slender effects on improvements in mechanical properties such as creep properties, modulus of elasticity and strength.

No particular limitation is imposed on the conductive carbon blacks used herein, provided that they are of electrical conductivity; for instance, acetylene black, oil furnace black, thermal black and channel black may be used. These may be used alone or in admixture of two or more.

No particular limitation is placed on the graphite used herein; for instance, artificial graphite obtained by graphitization at high temperatures of coke, tar, pitch or the like, and natural graphite such as lepidoblastic graphite, flake graphite and earthy graphite may be used.

The volume resistivity of the conductive filler used herein is less than $10^2$ $\Omega \cdot cm$, and the lower limit thereto is usually the volume resistivity of metal materials such as metal powders or metal fibers.

The proportion of the conductive filler incorporated should be in the range of 1 to 30% by mass on the basis of the total amount of the thermoplastic resin composition. When the proportion of the conductive filler is too high, the surface resistivity of an IC socket becomes too low, and so it is difficult to control that surface resistivity to the desired level or in the range of preferably $10^5$ to $10^{13}$ $\Omega/\square$. When the proportion of the conductive filler is too low, it is difficult to lower the surface resistivity of an IC socket down to a sufficient level.

The proportion of the conductive filler incorporated should be in the range of preferably 2 to 28% by mass, and more preferably 3 to 15% by mass. The sole use of the conductive filler renders strict control of surface resistivity to the desired level difficult, and causes the surface resistivity to vary largely from site to site. The combined use of the aforesaid proportion of the conductive filler with the carbon precursor ensures stable production of IC sockets having the desired surface resistivity with no or little variation.

4. Other Fillers

With a view to increasing mechanical strength and heat resistance, many other fillers may be incorporated in the IC socket of the invention. Fibrous fillers, for instance, include inorganic fibrous materials such as glass fibers, asbestos fibers, silica fibers, alumina fibers, zirconia fibers, boron nitride fibers, silicon nitride fibers, boron fibers and potassium titanate fibers; metal fibrous materials such as stainless, aluminum, titanium, copper and brass; high-melting organic fibrous materials such as polyamide, fluorocarbon resin, polyester resin and acrylic resin; and the like. In view of electrical insulation properties, it is preferable to use fibrous fillers having no conductivity such as glass fibers.

Particulate fillers, for instance, include mica, silica, talc, alumina, kaolin, calcium sulfate, calcium carbonate, titanium oxide, ferrite, clay, glass powders, zinc oxide, nickel carbonate, iron oxide, quartz powders, magnesium carbonate and barium sulfate.

These fillers may be used alone or in combination of two or more. If required, the fillers may have been treated with sizing or surface treating agents. The sizing or surface treating agents, for instance, include functional compounds such as epoxy compounds, isocyanate compounds, silane compounds and titanate compounds. These compounds may have been used ahead for the surface treatment of the fillers or, alternatively, may be added to the thermoplastic resin composition at the time of its preparation.

5. Additives

Various additives may be contained in the IC socket of the invention. The additives used herein, for instance, include impact modifiers such as epoxy group-containing α-olefin copolymers, resin modifiers such as ethylene glycidyl methacrylate, mold corrosion preventives such as zinc carbonate and nickel carbonate, lubricants such as pentaerythritol tetrastearate, thermosetting resins, antioxidants, UV absorbers, nucleating agents such as boron nitride, flame retardants, and colorants such as dyes or pigments. These additives may be added in suitable amounts as occasion may be.

6. Thermoplastic Resin Composition

The thermoplastic resin composition of the invention may be prepared using conventionally available, thermoplastic resin composition production equipment and processes. For instance, the respective raw material components are premixed in a Henschel or tumbler mixer. If required, the mixture is mixed with fillers such as glass fibers. Then, the mixture is kneaded and extruded through a single- or double-shaft extruder into a molding or forming pellet. Alternatively, a master batch comprising a part of the required components may be mixed with the rest. To enhance the dispersibility of each component, a part of the raw materials used may be pulverized into powders having a uniform particle diameter, and the pulverized product is then mixed with the rest for hot extrusion.

7. IC Socket

IC sockets may generally be produced by injection molding of the thermoplastic resin composition. However, reliance may be placed on other molding processes such as extrusion molding depending on the desired shape. The IC socket may include both a packaging IC socket and a measuring IC socket. The mainstream of the packaging IC socket is a connector type IC socket having general specifications for the interior of general electronic equipment. In most cases, the measuring IC socket includes an IC socket having dedicated specifications and used by semiconductor makers as part of their semiconductor production process and equipment.

Figure 2:
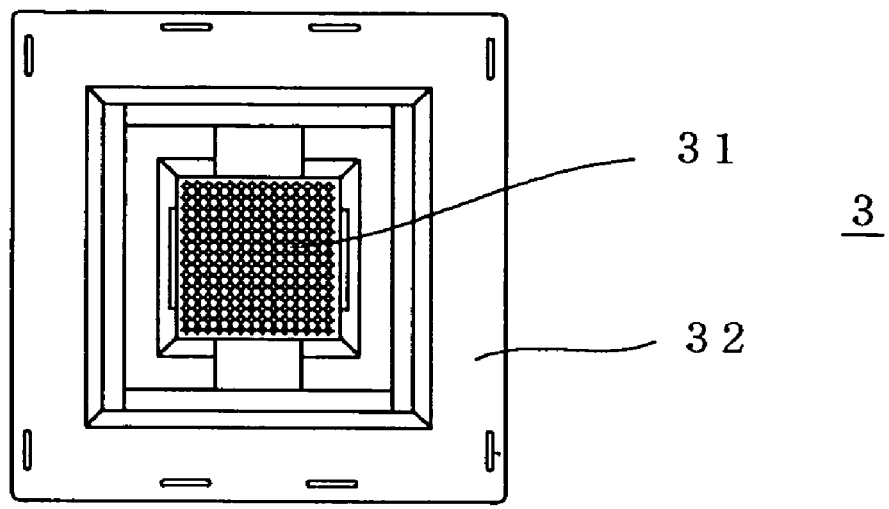
FIG. 2 is a top schematic illustrative of one example of an open-top type of burn-in testing IC socket.
Figure 3:
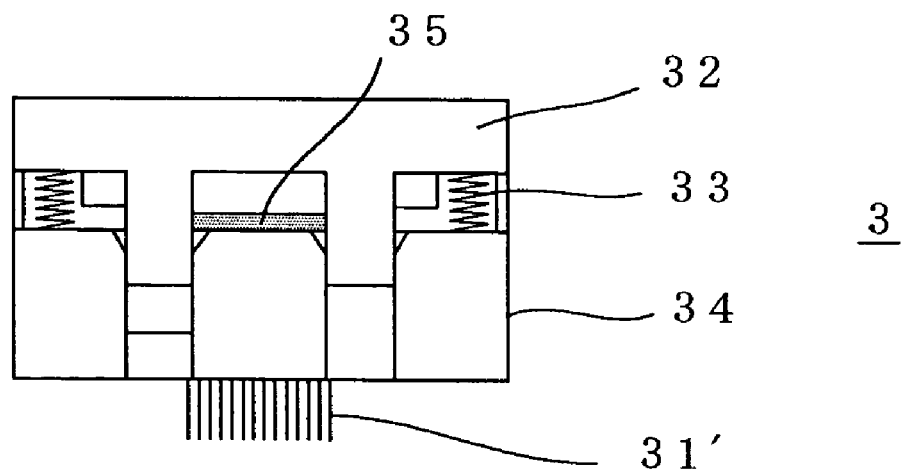
FIG. 3 is a sectional schematic illustrative of the side of the IC socket depicted in FIG. 2.

There is a wide range of commercially available IC sockets, on the shape and size of which are not particularly critical. The inventive IC socket includes one having structure comprising a combination of a body (bottom) member with a lid member. The inventive IC socket also encompasses one provided with conventional parts such as contact pins. Some illustrative, but not exclusive, embodiments of such an IC socket are shown in FIGS. 1 to 3.

Examples of the IC socket comprising the inventive thermoplastic resin composition are burn-in sockets, pin grid array (PGA) sockets, ball grid array (BGA) sockets, dual inline package (DIP) sockets, bare chip packaging sockets, flip chip packaging sockets, quad flat package (QFP) sockets, small outline package (SOP) sockets, and high-density packaging shrink pitch sockets.

Among burn-in sockets known so far in the art, there are those of various shapes such as spring probe, fan-out terminal, claim shell and open-top shapes.

The IC socket of the invention should have a surface resistivity in the range of preferably $10^5$ to $10^{13}$ Ω/□, more preferably $10^6$ to $10^{12}$ Ω/□, and even more preferably $10^7$ to $10^{11}$ Ω/□. An IC socket having too high a surface resistivity is likely to have a buildup of static electricity on its surface. As, in the inspection process of semiconductor devices in particular, a semiconductor device is in touch with an IC socket, the IC socket is susceptible to electrification via triboelectrification. With IC sockets having too low a surface resistivity, there is a risk of its own electrical insulation properties lowering.

The ratio between the maximum surface resistivity (MAX) and the minimum surface resistivity (MIN) of the IC socket of the invention (MAX/MIN) should preferably be 10 or less. Too high a ratio causes the surface resistivity to vary too largely to achieve strict control of triboelectrification and accumulation of static electricity.

The IC socket of the invention should preferably have a deflection temperature under load of 170° C. or higher. In consideration of environments where semiconductor devices are used, burn-in testing conditions, etc., IC sockets, too, are required to have a high degree of heat resistance. Here the deflection temperature under load may be adopted as a practical standard indicative of the heat resistance of IC sockets. The deflection temperature under load should be preferably 190° C. or higher, and more preferably 200° C. or higher. The upper limit to the deflection temperature under load is about 350° C. although depending on the components and their proportion of the thermoplastic resin composition.

To increase the deflection temperature under load of the IC socket, it is preferable to use as a thermoplastic resin at least one heat-resistant resin selected from the group consisting of crystalline resins having a melting point of 220° C.

or higher and amorphous resins having a glass transition temperature of 170° C. or higher. With such heat-resistant resins, it is also possible to easily obtain IC sockets improved in terms of electrical insulation properties, mechanical properties, heat resistance, chemical resistance, dimensional stability, etc.

EXAMPLES

The present invention is now explained more specifically with reference to the following reference example, inventive examples and comparative examples; however, it is understood that the invention is not limited to such examples alone. Physical properties were measured as set out below.

(1) Volume Resistivity

The volume resistivity exceeding $10^8$ Ω·cm was measured according to JIS K-6911 and at an applied voltage of 100 V, and the volume resistivity of less than $10^8$ Ω·cm was determined according to JIS K-7194 (the method for measuring the resistivity of conductive plastics by means of a four-probe process).

(2) Deflection Temperature Under Load

The deflection temperature under load was measured according to ASTM D-648 (1.82 MPa).

(3) Surface Resistivity of IC Socket

Using High Restor UP (made by Mitsubishi Chemical Industries, Ltd.) and a micro-sample probe (a guard electrode diameter of 10 mm: UR-SS Probe), the surface resistivity of the molded or otherwise formed IC socket was measured at an applied voltage of 100 V.

Measurements were obtained on five arbitrary spots on the formed product, with an average given regarding a measuring flat plate. Measurements were obtained on five spots on an IC socket to find out its maximum value (MAX) and minimum value (MIN), from which the maximum/minimum (MAX/MIN) ratio was calculated.

Reference Example 1

Preparation of Carbon Precursor

Petroleum pitch (68 kg) having a softening point of 210° C., a quinoline-insoluble matter content of 1% by mass and an H/C atomic ratio of 0.63 and 32 kg of naphthalene were charged in a pressure-resistant vessel having an internal volume of 300 L and provided with a stirring blade. The vessel was heated to 190° C. to melt and mix them together, and the resulting mixture was cooled down to 80 to 90° C. and then extruded to obtain a string form of formed product having a diameter of about 500 μm.

Subsequently, this string form of formed product was pulverized in such a way as to give a diameter-to-length ratio of about 1.5, and the obtained pulverized product was placed in a 0.53% by mass aqueous solution of polyvinyl alcohol (having a degree of saponification of 88%) heated to 93° C., dispersed under agitation, and then cooled down to obtain a spherically formed pitch product. Subsequently, the product was filtered for water removal, and treated in n-hexane in an about six-fold amount for extraction and removal of naphthalene from the formed pitch product.

The thus obtained, spherically formed pitch product was oxidized at 260° C. for 1 hour while heated air was fed thereto, thereby obtaining an oxidized pitch. This oxidized pitch was thermally treated at 580° C. for 1 hour in a nitrogen stream, and then pulverized to obtain carbon precursor particles having a mean particle diameter of about 25 μm and a carbon content of 91.0% by mass.

To learn the volume resistivity of the carbon precursor, a measuring sample was prepared as follows. The oxidized pitch was pulverized, and sieved through a mesh of about 100 μm in aperture for removal of particles of 100 μm or greater in diameter. Thirteen (13) grams of the pulverized oxidized pitch powders were filled up in a cylindrical mold of 80 $cm^2$ in cross-sectional area, wherein they were molded at a pressure of 196 MPa to obtain a molded product. The molded product was thermally treated in a nitrogen stream for 1 hour at 580° C. that was the same temperature as the thermal treatment temperature in the process for the preparation of the aforesaid carbon precursor particles, thereby obtaining a sample for measuring the volume resistivity of the carbon precursor. This sample was found to have a volume resistivity of $3\times10^7$ Ω·cm as measured according to JIS K-7194.

Inventive Examples 1–5 & Comparative Examples 1–4

The components shown in Table 1 were uniformly dry blended together in a tumbler mixer, and the mixture was fed through a double-shaft type of 45-mmϕ combined kneader/extruder (PCM-45 made by Ikegai Corp.), wherein it was hot extruded into a pellet. After dried, the obtained pellet was molded through an injection molding machine (IS-75 made by Toshiba Machine Co., Ltd.) to prepare a surface resistivity-measuring flat plate and a test piece for measuring deflection temperature under load, which were in turn used for the measurement of surface resistivity and deflection temperature under load.

Moreover, this pellet was injection molded to obtain an open-top type of 33 mm×33 mm burn-in socket for FBGA packaging (see FIGS. 2 and 3). This socket, too, was measured for its five-point surface resistivity to determine the maximum and minimum surface resistivity values, from which the maximum/minimum ratio was calculated.

The results are reported in Table 1 wherein, for instance, "1E+09 Ω/□" is indicative of a surface resistivity of "$1\times10^9$ Ω/□".

TABLE 1

|  | Inventive Example | | | | |
|---|---|---|---|---|---|
|  | 1 | 2 | 3 | 4 | 5 |
| TPR[1] (% by mass) | | | | | |
| PES | 70 | 75 | 0 | 0 | 0 |
| PEI | 0 | 0 | 72.5 | 0 | 0 |
| PEEK | 0 | 0 | 0 | 80 | 0 |
| PPS | 0 | 0 | 0 | 0 | 67 |
| CP[2] (% by mass) | 15 | 20 | 20 | 15 | 20 |
| CF[3] (% by mass) | | | | | |
| PAN Cf[4] | 0 | 5 | 7.5 | 5 | 6 |
| Pitch Cf[5] | 10 | 0 | 0 | 5 | 0 |
| Carbon Black | 0 | 0 | 0 | 0 | 0 |
| Ω/□[6] | 1E+09 | 1E+09 | 2E+09 | 5E+09 | 2E+08 |
| ° C.[7] | 220 | 220 | 205 | 305 | 255 |
| Ω/□[8] | 8E+09 | 6E+09 | 5E+09 | 2E+10 | 1E+09 |
| Ω/□[9] | 3E+10 | 1E+10 | 9E+09 | 7E+10 | 4E+09 |
| MAX/MIN Ratio | 3.75 | 1.67 | 1.80 | 3.50 | 4.00 |

TABLE 1-continued

| | Comparative Example | | | |
|---|---|---|---|---|
| | 1 | 2 | 3 | 4 |
| TPR[1] (% by mass) | | | | |
| PES | 82 | 78 | 80 | 78 |
| PEI | 0 | 0 | 0 | 0 |
| PEEK | 0 | 0 | 0 | 0 |
| PPS | 0 | 0 | 0 | 0 |
| CP[2] (% by mass) | 0 | 0 | 0 | 0 |
| CF[3] (% by mass) | | | | |
| PAN Cf[4] | 0 | 0 | 0 | 0 |
| Pitch Cf[5] | 18 | 22 | 0 | 0 |
| Carbon Black | 0 | 0 | 17 | 21 |
| Ω/□[6] | 3E+15 | 8E+04 | 1E+15 | 5E+03 |
| ° C.[7] | 220 | 220 | 210 | 210 |
| Ω/□[8] | 1E+08 | <1E+07 | <1E+07 | <1E+07 |
| Ω/□[9] | >1E+13 | >1E+13 | >1E+13 | 3E+11 |
| MAX/MIN Ratio | >10$^5$ | >10$^6$ | >10$^6$ | >3 × 10$^4$ |

[1]Thermoplastic Resin
[2]Carbon Precursor
[3]Conductive Fiber
[4]PAN Based Carbon Fiber
[5]Pitch Based Carbon Fiber
[6]Surface Resistivity
[7]Deflection Temperature Under Load
[8]Minimum Surface Resistivity
[9]Maximum Surface Resistivity
PES: Poly(ether sulfone) (Sumica Excel PES3600G (Tg = 225° C.) made by Sumitomo Chemical Co., Ltd.)
PEI: Poly(ether imide)(Ultem 1010 (Tg = 217° C.) made by GE Plastics Co., Ltd.)
PEEK: Poly(ether ether ketone) (PEEK150P (melting point = 334° C.) made by Bictrex MC Co., Ltd.)
PPS: Poly(phenylene sulfide) (Fortoron KPS W214 (melting point = 288° C.) made by Kureha Chemical Industry Co., Ltd.)
PAN Based Carbon Fiber: (Bethfight HTA 3000 (volume resistivity < 10$^2$ Ω · cm) made by Toho Rayon Co., Ltd.)
Pitch Based Carbon Fiber: Diareed K223QY (volume resistivity < 10$^2$ Ω · cm) made by Mitsubishi Chemical Industries, Ltd.)
Conductive Carbon Black: MA600B (volume resistivity < 10$^2$ Ω · cm) made by Mitsubishi Chemical Industries, Ltd.)

Considerations:

(1) Inventive Example 1

The surface resistivity of the flat plate comprising the thermoplastic resin composition with the carbon precursor and pitch carbon fibers incorporated in PES was 1E+09 (=1×10$^9$) Ω/□, and the IC socket showed a stable, or less variable, surface resistivity in the semi-conductive region as expressed in terms of (8E+09) to (3E+10) Ω/□. This IC socket was also found to have sufficient heat resistance as expressed in terms of a deflection temperature under load of 220° C.

(2) Inventive Examples 2, 3 and 5

The flat plate comprising the thermoplastic resin composition with the carbon precursor and PAN based carbon fibers incorporated in PES, PEI, and PPS, respectively, showed a surface resistivity stabilized at (2E+08) to (2E+09) Ω/□ in the semiconductive region, and the IC socket showed as well a stable, or less variable, surface resistivity of (1E+09) to (1E+10) Ω/□ in the semiconductive region. The resin compositions were all found to have sufficient heat resistance as expressed in terms of a deflection temperature under load of 200° C. or higher.

(3) Inventive Example 4

The surface resistivity of the flat plate comprising the thermoplastic resin composition with the carbon precursor, PAN based carbon fibers and pitch based carbon fibers incorporated in PEEK was 5E+09 Ω/□, and the IC socket showed a stable, or less variable, surface resistivity in the semiconductive region as expressed in terms of (2E+10) to (7E+10) Ω/□. This IC socket was also found to have sufficient heat resistance as expressed in terms of a deflection temperature under load of 305° C.

(4) Comparative Examples 1–2

When only the pitch based carbon fibers are incorporated in PES, the surface resistivity fluctuate largely even with a slight difference in the amount of the pitch based carbon fibers filled; it is difficult to reduce a stable surface resistivity down to the desired level. Large variations in the surface resistivity of the IC sockets offer problems in view of practical use.

(5) Comparative Examples 3–4

When only the conductive carbon black is incorporated in PES, the surface resistivity fluctuate largely even with a slight difference in the amount of the conductive carbon black filled; it is difficult to reduce a stable surface resistivity down to the desired level. Large variations in the surface resistivity of the IC sockets offer problems in view of practical use.

INDUSTRIAL APPLICABILITY

According to the present invention, there is provided an IC socket of synthetic resin, whose surface resistivity is strictly controlled to the desired level and which is much more improved in terms of electrical insulation properties, mechanical properties, heat resistance, chemical resistance, dimensional stability, etc.

The invention claimed is:
1. An IC socket obtained by forming or molding a thermoplastic resin composition comprising:
(A) 60 to 85% by mass of a thermoplastic resin,
(B) 10 to 25% by mass of a carbon precursor having a volume resistivity of 10$^2$ to 10$^{10}$ Ω·cm, and
(C) 3 to 15% by mass of an electrical conductive filler having a volume resistivity of less than 10$^2$ Ω·cm,
wherein said thermoplastic resin (A) comprises at least one heat-resistance resin selected from the group consisting of a crystalline resin (A1) having a melting point of 220° C. or higher and an amorphous resin (A2) having a glass transition temperature of 170° C. or higher, and
wherein the IC socket has a deflection temperature under load of 200° C. or higher, a surface resistivity of 10$^7$ to 10$^{11}$ Ω/□, and a MAX/MIN ratio of 10 or less, wherein MAX is the maximum surface resistivity thereof and MIN is the minimum surface resistivity thereof.
2. The IC socket according to claim 1, wherein said crystalline resin (A1) is at least one crystalline resin selected from the group consisting of poly(phenylene sulfide), poly(ether ether ketone), poly(ether ketone), polyamide, polybutylene terephthalate, polyethylene terephthalate, total aromatic polyester and fluorocarbon resin.
3. The IC socket according to claim 1, wherein said amorphous resin (A2) is at least one amorphous resin selected from the group consisting of poly(ether sulfone), poly(ether imide), polysulfone, polyarylate, poly (phenylene ether) and polyamide-imide.

4. The IC socket according to claim 1, wherein said carbon precursor (B) is a substance that is obtained by firing an organic substance in an inert atmosphere and having a carbon content of 80 to 97% by mass.

5. The IC socket according to claim 1, wherein said conductive filler (C) is a carbon fiber.

6. The IC socket according to claim 5, wherein said carbon fiber is at least one carbon fiber selected from the group consisting of a polyacrylonitrile based carbon fiber and a pitch based carbon fiber.

7. The IC socket according to claim 1, which is a packaging IC socket.

8. The IC socket according to claim 1, which is a measuring IC socket.

9. The IC socket according to claim 8, wherein the measuring IC socket is a burn-in socket.

* * * * *